United States Patent [19]

Hirose et al.

[11] Patent Number: 4,963,626

[45] Date of Patent: Oct. 16, 1990

[54] CURABLE POLYMER COMPOSITION

[75] Inventors: Toshifumi Hirose; Katsuhiko Isayama, both of Kobe, Japan

[73] Assignee: Kanegafuchi Chemical Industry Co. Ltd., Osaka, Japan

[21] Appl. No.: 298,968

[22] Filed: Jan. 19, 1989

[30] Foreign Application Priority Data

Jan. 21, 1988 [JP] Japan .................................. 63-11789
Jan. 21, 1988 [JP] Japan .................................. 63-11790

[51] Int. Cl.$^5$ ............................................. C08G 65/32
[52] U.S. Cl. ..................... 525/403; 528/28; 528/34; 528/42; 524/729; 524/775
[58] Field of Search .................... 525/403; 528/34, 42, 528/28

[56] References Cited

U.S. PATENT DOCUMENTS 4,463,115  7/1984  Hirose et al. ...................... 524/188
4,786,667  11/1988  Shimizu et al. ...................... 528/28

*Primary Examiner*—Melvyn I. Marquis
*Attorney, Agent, or Firm*—Wegner & Bretschneider

[57] ABSTRACT

A curable polymer composition which comprises (A) an oxyalkylene base polymer having at least one silicon-containing group to the silicon atom of which a hydroxyl group or a hydrolyzable group is bonded and which is cross linkable through formation of a siloxane bond and (B) at least one compound selected from the group consisting of a silicon-containing compound having at least one long chain hydrocarbon group and a silicon-containing compound having at least one fluorohydrocarbon group in an amount of 0.1 to 30 parts by weight per 100 parts by weight of the polymer (A), which composition provides a cured material having improved surface properties.

8 Claims, No Drawings

CURABLE POLYMER COMPOSITION

BACKGROUND OF THE INVENTION

1. Field of the Invention

The present invention relates to a curable polymer composition which is cured in the presence of moisture or water to provide a cured material having good surface properties, namely less tendency to attract dusts. More particularly, the present invention relates to a curable polymer composition comprising an oxyalkylene base polymer having a silicon-containing group to the silicon atom of which a hydroxyl group or a hydrolyzable group is bonded and which is cross linkable through formation of a siloxane bond (hereinafter often referred to as a "silicon-containing reactive group") and a specific silicon-containing compound.

2. Description of the Related Art

There have been proposed many organic polymers having at least one silicon-containing reactive group in a molecule. Those polymers have such a property that they are curable at room temperature and are known as room temperature curable liquid rubbers. Some of those polymers such as organic polymers comprising a backbone chain of polyoxypropylene and a methoxysilyl end group are commercially produced (e.g. "MS Polymer", a trade name of Kanegafuchi Chemical Industry Co., Ltd.).

The above organic polymer is compounded with various additives and used as a sealing agent and the like. However, a surface of the cured material of the organic polymer tends to attract dusts. Then, improvement of the surface property of the cured material has been desired.

SUMMARY OF THE INVENTION

An object of the present invention is to provide a curable polymer composition which is cured in the presence of moisture to provide a cured material having such a good surface properties that it has less tendency to attract dusts.

This and other objects of the present invention are accomplished by a curable polymer composition which comprises (A) an oxyalkylene base polymer having at least one silicon-containing group to the silicon atom of which a hydroxyl group or a hydrolyzable group is bonded and which is cross linkable through formation of a siloxane bond and (B) at least one compound selected from the group consisting of a silicon-containing compound having at least one long chain hydrocarbon group and a silicon-containing compound having at least one fluorohydrocarbon group in an amount of 0.1 to 30 parts by weight per 100 parts by weight of the polymer (A).

DETAILED DESCRIPTION OF THE INVENTION

The curable polymer composition of the present invention comprises, as a polymer component, the oxyalkylene base polymer having at least one silicon-containing reactive group (hereinafter referred to as an "oxyalkylene base polymer (A)").

The oxyalkylene base polymer (A) may be selected from known oxyalkylene base polymers. Typical oxyalkylene base polymers are described in U.S. Pat. Nos. 3,971,751, 3,979,384 and 4,323,488 the disclosures of which are hereby incorporated by reference, Japanese Patent Publication Nos. 36319/1970, 12154/1971 and 32673/1974, and Japanese Patent Kokai Publication Nos. 156599/1975, 73561/1976, 6096/1979, 82123/1980, 123620/1980, 125121/1980, 131022/1980, 135135/1980 and 137129/1980.

In general, the oxyalkylene base polymer (A) comprises a backbone chain comprising repeating units of the formula:

$$-R^1-O-$$

wherein $R^1$ is a straight or branched, substituted or unsubstituted $C_1$-$C_8$ divalent hydrocarbon group. Preferably, $R^1$ is a $C_1$-$C_8$ alkylene group, particularly a $C_2$-$C_4$ alkylene group. The hydrocarbon group may be substituted with a substituent such as a halogen atom (e.g. chlorine).

Specific examples of $R^1$ are $-CH(CH_3)-CH_2-$, $-CH(CH)-CH_2-$, $`CH_3)2-CH_2-$, $-CH_2CH_2CH_2CH_2-$ etc. Among them, $-CH(CH_3)-CH_2-$ is preferable.

The backbone chain of oxyalkylene base polymer (A) may comprise a single kind of the repeating unit or two or more kinds of the repeating units. The backbone chain of oxyalkylene base polymer (A) may comprise repeating units other than the $-R^1-O-$ units. In this case, the content of the $-R^1-O-$ units is not less than 50 % by weight based on the total weight of the repeating units.

The silicon-containing reactive group bonded to the backbone chain of oxyalkylene base polymer (A) is a well known functional group and has such characteristic that it is cross linkable at room temperature. One of typical silicon-containing reactive groups is represented by the formula;

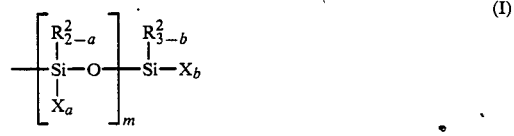

wherein $R^2$ is a straight or branched, substituted or unsubstituted $C_1$-$C_{20}$ organic group; X is a hydroxyl group or a hydrolyzable group; a is 0, 1 or 2; b is 0, 1, 2 or 3; and m is an integer of 0 to 19, provided that when two or more $R^2$ groups are present, they may be the same or different, that when two or more X substituents are present, they may be the same or different, that the sum of (m × a) plus b is not less than 1 (one), that when m is not less than 2, the kinds of the repeating units in the brackets may be the same or different. Among the silicon-containing reactive groups (I), a group of the formula:

wherein $R^2$ and X are the same as defined above, l is 1, 2 or 3 is preferable from the economical view point.

Specific examples of the hydrolyzable group X in the formula (I) or (II) are halogen atoms (e.g. chlorine), a hydrogen atom, alkoxy groups (e.g. a methoxy group and an ethoxy group), acyloxy groups (e.g. an acetoxy group), ketoxyxime groups, (e.g. a dimethylketoxymate group), amino groups (e.g. a dimethylamino group), acid amide groups (e.g. an N-methylacetamide group), aminoxy groups (e.g. a dimethylaminoxy group), mercapto groups (e.g. a thiophenoxy group), alkenyloxy groups (e.g. an isopropenyloxy group), and the like. Among them, the alkoxy groups such as the methoxy group and the ethoxy group are preferred in view of their mild hydrolyzability.

The $R^2$ group in the formula (I) or (II) is a substituted or unsubstituted $C_1$—$C_{20}$, preferably $C_1$—$C_{10}$ hydrocarbon group. Specific examples are substituted or unsubstituted alkyl groups (e.g. a methyl group, an ethyl group and a chloromethyl group), cycloalkyl groups (e.g. a cyclohexyl group), alkenyl groups (e.g. a vinyl group), substituted or unsubstituted aryl groups (e.g. a phenyl group, a tolyl group and a chlorophenyl group) and aralkyl groups (e.g. a benzyl group). Further example of the $R^2$ group is a triorganosiloxy group of the formula:

(R')$_3$SiO— wherein R' groups are the same or different and each a substituted or unsubstituted monovalent hydrocarbon group such as a methyl group and a phenyl group. Among these groups, the methyl group is preferable as the $R^2$ group.

The oxyalkylene base polymer (A) may have at least one silicon-containing reactive group in a molecule. In view of preferable curing properties, the polymer (A) has 1.1, preferably 1.5 to 4 silicon-containing reactive groups on the average in a molecule. Preferably, the silicon-containing reactive group is bonded to the molecule end of the oxyalkylene base polymer (A).

The oxyalkylene base polymer (A) preferably has a number average molecular weight of 500 to 30,000, more preferably 3,000 to 15,000. The oxyalkylene base polymers (A) may be used independently or a mixture of two or more of them.

The oxyalkylene base polymer (A) may be prepared by addition reacting a hydrosilyl compound consisting of the group (I) to which a hydrogen atom is bonded and an oxyalkylene base polymer having an ethylenically unsaturated group of the formula:

(III)

wherein $R^3$ is a hydrogen atom or a $C_1$-$C_{20}$ monovalent organic group, $R^4$ is a $C_1$—$C_{20}$ divalent organic group and c is 0 or 1 in the presence of a platinum compound as a catalyst.

Other processes for preparing the oxyalkylene base polymer (A) are as follows:

(1) An oxyalkylene base polymer having a terminal hydroxyl group is reacted with a polyisocyanate compound such as toluenediisocyanate to produce an oxyalkylene base polymer having a terminal isocyanate group, which is then reacted with a silicon-containing compound of the formula:

(IV)

wherein W is an active hydrogen-containing group selected from the group consisting of a hydroxyl group, a carboxyl group, a mercapto group and a primary or secondary amino group, and l, $R^2$, $R^4$ and X are the same as defined above.

(2) An oxyalkylene base polymer (A) having the ethylenically unsaturated group (III) is reacted with the silicon-containing compound (IV) in which W is a mercapto group.

(3) An oxyalkylene base polymer (A) having a terminal hydroxyl group is reacted with a compound of the formula:

(V)

wherein $R^2$, $R^4$, X and : are the same as defined above.

These reactions do not limit the present invention.

In the preparation of oxyalkylene base polymer (A), all or a part of the X groups may be converted to other hydrolyzable groups or hydroxyl groups. For example, when the X group is the halogen or hydrogen atom, it can be preferably converted to an alkoxy group, an acyloxy group, aminoxy group, alkenyloxy group or a hydroxyl group.

In the formula (III), $R^3$ is a hydrogen atom or a substituted or unsubstituted $C_1$—$C_{20}$ monovalent organic group. Among them, the hydrogen atom and a hydrocarbon group are preferable. Particularly preferable is the hydrogen atom. $R^4$ is a $C_1$—$C_{20}$ divalent organic group and preferably —$R^5$—, —$R^5OR^5$—, —$R^5$—OCO , —$R^5NHCO$ or —$R^5$—CO—wherein $R^5$ is a $C_1$—$C_{10}$ divalent hydrocarbon group. Among them, a methylene group, an ethylene group, a propylene group and a butylene group are more preferable.

As described in Japanese Patent Kokai Publication No. 6097/1979, the oxyalkylene base polymer (A) having the ethylenically unsaturated group (III) may be prepared as follows:

The terminal hydroxyl group in the oxyalkylene base polymer (A) is reacted with a compound having said unsaturated group to introduce the unsaturated group at the molecular end through an ether, ester, urethane or carbonate bond. Alternatively, during polymerization, an epoxy compound such as ethylene oxide or propylene oxide is copolymerized with an epoxy compound having the ethylenically unsaturated group such as allyl glycidyl ether to introduce the ethylenically unsaturated group in side chains.

The curable polymer composition of the present invention contains the silicon-containing compound having the long chain hydrocarbon group or the fluorohydrocarbon group (hereinafter referred to as a "silicon-containing compound (B)") to make the surface of the cured material less attracting dusts.

The long chain hydrocarbon group in the silicon-containing compound (B) is intended to mean a hydrocarbon group which has a straight hydrocarbon chain having at least 8 carbon atoms, preferably 8 to 20 carbon atoms (not including carbon atoms in the cyclic group) and includes a long chain alkyl group, a long chain alkenyl group, a cycloalkyl or aryl group having a long chain alkyl or alkenyl group and a long chain alkylene group.

Specific examples of the long chain alkyl group are n-octyl, decyl, undecyl, dodecyl, tridecyl, tetradecyl, cetyl, stearyl, eicosyl and the like. Specific examples of the long chain alkenyl group are octenyl, nonenyl, decenyl, dodecenyl, tetradecenyl, hexadecenyl, octadecenyl, eicosenyl, octadecadienyl, 9,12,15-octadecatrienyl, 9,11,13-octadecatrienyl and the like. Specific examples of the long chain alkylene group are —(CH$_2$)-

$10-$, $-(CH_2)_{12}-$, $-(CH_2)_{14}-$, $-(CH_2)_{16}-$, $-(CH_2)_{18}-$, $-(CH_2)_{20}-$ and the like.

The silicon-containing compound (B) having the long chain hydrocarbon group has the silicon-containing reactive group. The silicon-containing reactive group in the compound (B) may be the same as that contained in the oxyalkylene base polymer (A). Among the silicon-containing reactive groups, those having one silicon atom are preferred from the economical view point.

Specific examples of the silicon-containing compound (B) having the long chain hydrocarbon group are $CH_3(CH_2)_{10}Si(OCH_3)_3$, $CH_3(CH_2)_{10}Si(OCH_2CH_3)_3$, $CH_3(CH_2)_{10}Si(CH_3)(OCH_2CH_3)_2$, $CH_3(CH_2)_{17}Si(OCH_3)_3$, $CH_3(CH_2)_{17}Si(OCH_2CH_3)_3$, $CH_3(CH_2)_{17}Si(CH_3)(OCH_3)_2$, $(CH_3O)_2(CH_3)Si(CH_2)_{10}Si(CH_3)(OCH_3)_2$, The fluorohydrocarbon group in the silicon-containing compound (B) is intended to mean a $C_1-C_{20}$ alkyl group at least a part of the hydrogen atoms, preferably 30 % of the hydrogen atoms of which alkyl group are replaced with fluorine atoms and includes $CF_3-$, $CF_3CH_2CH_2-$, $CF_3(CF_2)_5CH_2CH_2$'$CF_3(CF_2)_7CHCH$'$CF_3(CF_2)_{10}CHCH$'$CF_3(CF_2)_{15}CHCH$, etc.

The silicon-containing compound (B) having the fluorohydrocarbon group has the silicon-containing reactive group. The silicon-containing reactive group in the compound (B) may be the same as that contained in the oxyalkylene base polymer (A). Among the silicon-containing reactive groups, those having one silicon atom are preferred from the economical view point.

Specific examples of the silicon-containing compound (B) having the fluorohydrocarbon group are $CF_3CH_2CH_2Si(OCH_3)_3$, $CF_3(CF_2)_7CH_2CH_2Si(OCH_3)_3$, $CF_3(CF_2)_7CH_2CH_2Si(CH_3)(OCH_3)_2$, $CF_3(CF_2)_5CH_2CH_2Si(OCH_3)_3$, $CF_3CH_2CH_2Si(CH_3)(OCH_3)_2$, $CF_3(CF_2)_5CH_2CH_2Si(CH_3)(OCH_3)_2$, $CF_3(CF_2)_{10}CH_2CH_2Si(OCH_3)_3$, $CF_3(CF_2)_{15}CH_2CH_2Si(OCH_3)_3$, etc.

The silicon-containing compound (B) is contained in the curable polymer composition in an amount of 0.1 to 30 parts by weight, preferably 0.1 to 20 parts by weight, more preferably 0.5 to 20 parts by weight per 100 parts by weight of the oxyalkylene base polymer (A). When the amount of the silicon-containing compound (B) is less than 0.1 parts by weight, the effect of said compound (B), namely suppression of attracting dusts on the surface of the cured material is not sufficiently achieved. When said amount is more than 30 parts by weight, the composition becomes expensive and tensile properties of the cured material are deteriorated.

The curable polymer composition of the present invention may be prepared by any of the conventional methods. For example, the composition can be prepared by simply adding the silicon-containing compound (B) to the oxyalkylene base polymer (A). In this case, heating and/or stirring conditions are adjusted according to properties of the silicon-containing compound (B) so as to homogeneously disperse or dissolve the silicon-containing compound (B) in the oxyalkylene base polymer (A). However, it is not necessary to obtain a completely transparent homogeneous composition, but homogeneous dispersion of the silicon-containing compound (B) is sufficient even when the composition is opaque. If necessary, an additive for improving dispersion such as a surfactant may be used.

If desired, the curable polymer composition of the resent invention may contain various additives such as a curing catalyst, an antistatic agent for further decreasing the tendency to attract dusts on the surface of cured material due to static electricity, a physical property modifier which improves the tensile properties of the cured material, a reinforcing or non-reinforcing filler, a plasticizer, an adhesion accelerator, an anti-sagging agent, a colorant, an anti-aging agent, a flame-retardant and the like.

Specific examples of the curing catalyst are titanates (e.g. tetrabutyl titanate and tetrapropyl titanate); organic tin compounds (e.g. dibutyltin dilaurate, dibutyltin maleate, dibutyltin diacetate, dibutyltin diacetylacetonate, tin octylate and tin naphthenate); lead octylate; amines (e.g. butylamine, octylamine, laurylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(-dimethylaminomethyl)phenol, morpholine, N-methylmorpholine and 1,8-diaza-bicyclo[5.4.0]undecene-7 (DBU)) and salts thereof with carboxylic acids; low molecular weight polyamide resins prepared from excessive polyamines and polybasic acids; reaction products of excessive polyamines and epoxide compounds; silane coupling agents having an amino group (e.g. γ-aminopropyltrimethoxysilane and N-(β-aminoethyl)aminopropylmethyldimethoxysilane), and other conventional silanol condensation catalysts. These catalysts may be used independently or a mixture of two or more of them.

Specific examples of the antistatic agent are nonionic antistatic agents (e.g. polyoxyethylenealkylamine, polyoxyethylenealkylamide, polyoxyethylene alkyl ether, polyoxyethylenealkyl phenyl ether, partial esters of glycerine and partial esters of sorbitane); anionic antistatic agents (e.g. alkyl sulfonate, alkylbenzene sulfonate, alkyl sulfate and alkyl phosphate); cationic antistatic agents (e.g. quaternary ammonium chloride, quaternary ammonium sulfate and quaternary ammonium nitrate), amphoteric antistatic agents (e.g. alky betaine type, alkylimidazoline type and alkylalanine type) and electrically conductive resin type antistatic agents (e.g. polyvinylbenzyl type cationic resins and polyacrylic acid type cationic resins).

Specific examples of the physical property modifier are silane coupling agents such as alkoxysilanes having functional groups e.g. γ-glycidoxypropylmethyldimethoxysilane. γ-glycidoxypropyltrimethoxysilane, N-(β- aminoethyl)aminopropylmethyldimethoxysilane, N-(β-aminoethyl)-aminopropyltrimethoxysilane, γ-mercaptopropylmethyldimethoxysilane and γ-mercaptopropyltrimethoxysilane) and isopropenoxysilanes having functional groups (e.g. dimethyldiisopropenoxysilane and γ-glycidoxypropylmethyldiisopropenoxysilane). Additional examples of the silane coupling agents are those described in U.S. Pat. No. 4,788,254 the disclosure of which is hereby incorporated by reference and includes $(CH_3)_3SiOH$, $(C_6H_5)_2Si(CH_3)OH$, $(CH_3)_2Si(C_6H_5)OH$,

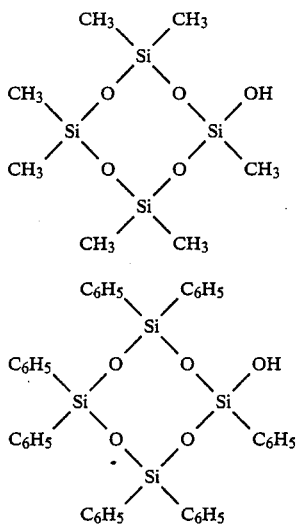

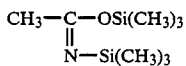

The reinforcing or non-reinforcing filler may be any of the conventionally used ones, and includes glue type calcium carbonate, heavy or light calcium carbonate, calcium carbonate particles coated with fatty acids, resinaacids, cationic surfactants, anioinc surfactants or the like, magnesium carbonate, talc, titanium oxide, barium sulfate, metal powders such as alumina, aluminum, zinc and iron powders, bentonite, kaolin, clay, fumed silica, quartz powder, white carbon, carbon black, asbestos or glass fiber. When the reinforcing or non-reinforcing filler which keeps transparency of the resin is used, a sealing agent having good transparency can be obtained. The fillers may be used independently or as a mixture thereof.

Specific examples of the plasticizer are phthalates (e.g. dibutyl phthalate, diheptyl phthalate, di(2-ethylhexyl) phthalate, dioctyl phthalate, butylbenzyl phtha late and butylphthalyl butyl glycolate), esters of nonaromatic dibasic acids (e.g. dioctyl adipate and dioctyl sebacate). esters of polyalkylene glycol (e.g. diethylene glycol dibenzoate and triethylene glycol dibenzoate), phosphates (e.g. tricresyl phosphate and tributyl phosphate) chlorinated paraffins, hydrocarbon base oils (e.g. alkyldiphenyl and partially hydrogenated terphenyl) and mixtures thereof. The plasticizer may be added to the polymer during its polymerization.

The adhesion accelerator is not necessarily added to the resinous composition since the oxyalkylene base polymer (A) itself has good adhesion to glass, ceramics other than glass or metals or can be adhered to various material through various primers. When at least one of epoxy resins, phenol resins, the silane coupling agents which are exemplified as the physical property modifiers, alkyl titanates are aromatic polyisocyanates is used as the adhesion accelerator, the adhesiveness of the composition to various substrates can be improved.

Specific examples of the anti-sagging agent are hydrogenated castor oil derivatives, metallic soaps (e.g. calcium stearate, aluminum stearate and barium stearate). Depending on the end use of the composition or the kinds of the fillers, the anti-sagging agent may not be used.

As the colorant, conventional inorganic or organic pigments or dyes may be used.

As the anti-aging agent, conventional antioxidants or UV light absorbers may be used.

To the curable polymer composition of the present invention, solvents may be added to improve processability or decrease the viscosity of the composition. Examples of the solvents are aromatic hydrocarbons (e.g. toluene and xylene), esters (e.g. ethyl acetate, butyl acetate, amyl acetate and cellosolve acetate), ketones (e.g. methyl ethyl ketone, methyl isobutyl ketone and diisobutyl ketone) and the like. The solvents may be added during polymerization.

When the curable polymer composition of the present invention is used as the sealing agent, it can be prepared as a one-pack type agent by compounding all the ingredients and stored in a sealed state. After application, the composition is cured with moisture in the air. Alternatively, the curable polymer composition of the present invention can be used as a two-pack type agent which comprises the polymer component and a curing agent component containing the curing catalyst, the filler, the plasticize:, water and the like. In use, two components are mixed to effect curing.

In case of the one-pack type sealing agent, since all the ingredients except water or moisture are compounded, they are preferably dehydrated before or during compounding by applying reduced pressure.

In case of the two-pack type sealing agent, since a main component containing the oxyalkylene base polymer (A) and the silicon-containing compound (B) contains no curing catalyst, it is not gelled if it contains a slight amount of water. When the sealing agent is stored for a long time, it is preferably dehydrated and dried.

For dehydrating or drying solid ingredients such as powder, heating is preferable and for dehydrating liquid ingredients, vacuum drying or dehydration with synthetic zeolite, active alumina, silica gel and the like is preferable. In addition, a small amount of an isocyanate compound is added so that water is trapped through the reaction between the the isocyanate and water.

In addition to the dehydration or drying, the storage stability of the composition is further increased by the addition of lower alcohols (e.g. methanol and ethanol) or alkoxysilane compounds (e.g. n-propyltrimethoxysilane, vinylmethyldimethoxysilane, γ-mercaptopropylmethyldimethoxysilane, γ-mercaptopropylmethyldiethoxysilane and γ-glycidoxypropyltrimethoxysilane).

The curable polymer composition of the present invention can be used as an adhesive, a coating, a sealing agent, a waterproofing agent, a spray coating, a templating material or a castable rubber material. Preferably, the curable polymer composition is used as the sealing agent.

PREFERRED EMBODIMENTS OF THE INVENTION

The present invention will be explained by following Examples.

Examples 1-11 and Comparative Example 1

To a propyleneoxide base polymer having about two dimethoxysilyl groups ($-Si(CH_3)(OCH_3)_2$) per molecule on the average and an average molecular weight of 10,000 (100 g), a silicon-containing compound having a long chain hydrocarbon group shown in Table 1 was added in an amount of Table 1. Then, glue type calcium carbonate ("CCR", a trade name of Shiraishi Industries) (150 g), dioctyl phthalate (65 g), a hindered phenol type anti-aging agent ("Noclack NS-6", a trade name of Ohuchi Shinko Chemical) (1 g), tin(II) octylate (3 g) and laurylamine (1 g) were added. The mixture was well kneaded and passed through a three roll paint mill three times to form a sheet having a thickness of about 3 mm. A piece of the sheet was aged at 23° C, 65 %RH for one day and then subjected to outdoor weathering with facing south at an angle of 45° for one or two months. Depositior of dusts on the test piece was observed The results are shown Table 1.

In Comparative Example 1, no silicon-containing compound having a long chain hydrocarbon group was used.

In Table 1, "A" stands for adhesion of few dusts, "B" stands for adhesion of a few dusts and "C" stands for adhesion of a fair amount of dusts.

TABLE 1

| | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | C.1 |
| Silicon-cont. compound | | | | | | | | | | | | |
| $CH_3(CH_2)_{17}Si(CH_3)(OCH_3)_2$ | 2 | — | — | — | — | — | — | — | 5 | 10 | 20 | — |
| $CH_3(CH_2)_{17}Si(OCH_3)_3$ | — | 2 | — | — | — | — | — | — | — | — | — | — |
| $CH_3(CH_2)_{17}Si(OCH_2CH_3)_3$ | — | — | 2 | — | — | — | — | — | — | — | — | — |
| $CH_3(CH_2)_{10}Si(OCH_3)_3$ | — | — | — | 2 | — | 5 | 1 | 0.5 | — | — | — | — |
| $(CH_3O)_3Si(CH_2)_{10}Si(OCH_3)_3$ | — | — | — | — | 2 | — | — | — | — | — | — | — |
| Dust deposition | | | | | | | | | | | | |
| After one month | A | A | A | A | A | A | A | A-B | A | A | A | B |
| After two month | B | B | B | A | A | A | B | B | A | A | A | C |

From the results of Table 1, it is understood that the addition of the silicon-containing compound having the long chain hydrocarbon group reduces the dust adhesion.

Examples 12-19

In the same manner as in Examples 1-11 but using a silicon-containing compounds having a fluorohydrocarbon group shown in Table 2 in place of the silicon-containing compounds having the long chain hydrocarbon group, the dust deposition on the sample sheet was evaluated. The results are shown in Table 2. From these results, it is understood that the addition of the silicon-containing compound having the fluorohydrocarbon group reduces the dust adhesion.

TABLE 2

| | Example No. | | | | | | | | |
|---|---|---|---|---|---|---|---|---|---|
| | 12 | 13 | 14 | 15 | 16 | 17 | 18 | 19 | C.1 |
| Silicon-cont. compound | | | | | | | | | |
| $CF_3CH_2CH_2Si(OCH_3)_3$ | 2 | — | — | — | 1 | 0.5 | — | — | — |
| $CF_3(CF_2)_7CH_2CH_2Si(OCH_3)_3$ | — | 2 | — | — | — | — | — | — | — |
| $CF_3(CF_2)_7CH_2CH_2SiCH_3(OCH_3)_2$ | — | — | 2 | — | — | — | 5 | 10 | — |
| $CF_3(CF_2)_5CH_2CH_2Si(OCH_3)_3$ | — | — | — | 2 | — | — | — | — | — |
| Dust deposition | | | | | | | | | |
| After one month | A | A | A | A | A | B | A | A | B |
| After two month | A | B | B | A | B | B | A | A | C |

Examples 20-24 and Comparative Example 2

In the same manner as in Examples 1-11 but using a polymer (100 g) which had been prepared by adding $C_6H_5OSi(CH_3)_3$ (3 g) to a propyleneoxide base polymer having 2.7 dimethoxysilyl groups per molecule on the average and an average molecular weight of 10,000 (100 g) and a silicon-containing compound having a long chain hydrocarbon group shown in Table 3 in an amount of Table 3, the dust deposition on the sample sheet was evaluated. The results are shown in Table 3. From these results, it is understood that the polymer modified with $C_6H_5OSi(CH_3)_3$ can achieve substantially the same results as in Examples 1-11.

TABLE 3

| | Example No. | | | | | |
|---|---|---|---|---|---|---|
| | 20 | 21 | 22 | 23 | 24 | C.2 |
| Silicon-cont. compound | | | | | | |
| $CH_3(CH_2)_{17}Si(CH_3)(OCH_3)_2$ | 2 | — | — | — | — | — |
| $CH_3(CH_2)_{17}Si(OCH_3)_3$ | — | 2 | — | — | — | — |
| $CH_3(CH_2)_{10}Si(OCH_3)_3$ | — | — | 2 | — | 1 | — |
| $(CH_3O)_3Si(CH_2)_{10}Si(OCH_3)_3$ | — | — | — | 2 | — | — |
| Dust deposition | | | | | | |
| After one month | A | A | A- | A | A | B |
| After two month | B | A | A | A | A | B |

Examples 25-30

In the same manner as in Examples 20-24 but using a silicon-containing compounds having a fluorohydrocarbon group shown in Table 4 inplace of the silicon-containing compounds having the long chain hydrocarbon group, the dust deposition on the sample sheet was evaluated. The results are shown in Table 4. From these results, it is understood that that the polymer modified with $C_6H_5OSi(CH_3)_3$ can achieve substantially the same results as in Examples 12-19.

TABLE 4

|  | Example No. | | | | | | |
|---|---|---|---|---|---|---|---|
|  | 25 | 26 | 27 | 28 | 29 | 39 | C.1 |
| Silicon-cont. compound | | | | | | | |
| $CF_3CH_2CH_2Si(OCH_3)_3$ | 2 | — | — | — | 1 | 0.5 | — |
| $CF_3(CF_2)_7CH_2CH_2Si(OCH_3)_3$ | — | 2 | — | — | — | — | — |
| $CF_3(CF_2)_7CH_2CH_2SiCH_3(OCH_3)_2$ | — | — | 2 | — | — | — | — |
| $CF_3(CF_2)_5CH_2CH_2Si(OCH_3)_3$ | — | — | — | 2 | — | — | — |
| Dust deposition | | | | | | | |
| After one month | A | A | A | A | A | A | B |
| After two month | A | A | B | A | A | B | B |

What is claimed is:

1. (Amended) A curable polymer composition which comprises
    (A) an oxyalkylene base polymer having at least one silicon-containing group to the silicon atom of which a hydroxyl group or a hydrolyzable group is bonded and which is cross linkable through formation of a siloxane bond and
    (B) at least one compound selected from the group consisting of a silicon-containing compound having at least one long chain hydrocarbon group containing at least 8 carbon atoms in a straight chain part, and a silicon-containing compound having at least one fluorohydrocarbon group in an amount of 0.1 to 30 parts by weight per 100 parts by weight of the polymer (A), which fluorohydrocarbon group is a $C_1$-$C_{20}$—alkyl group wherein 3–33 hydrogen atoms are replaced by fluorine atoms.

2. The curable polymer composition according to claim 1, wherein the oxyalkylene base polymer (A) comprises a backbone chain comprising repeating units of the formula:
$$-R^1O-$$
wherein $R^1$ is a straight or branched, substituted or unsubstituted $C_1$-$C_8$ divalent hydrocarbon group.

3. The curable polymer composition according to claim 2, wherein $R^1$ is a straight or branched, substituted or unsubstituted $C_1$-$C_8$ alkylene group.

4. The curable polymer composition according to claim 1, wherein the silicon-containing reactive groups is represented by the formula:

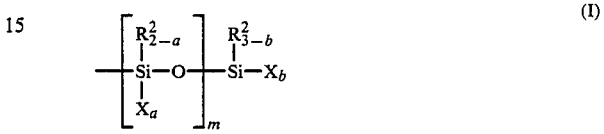

wherein $R^2$ is a straight or branched, substituted or unsubstituted $C_1$—$C_{20}$ organic group; X is a hydroxyl group or a hydrolyzable group; a is 0, 1 or 2; b is 0, 1, 2 or 3; and m is an integer of 0 to 19, provided that when two or more $R^2$ groups are present, they may be the same or different, that when two or more X substituents are present, they may be the same or different, that the sum of (m×a) plus b is not less than 1, that when m is not less than 2, the kinds of the repeating units in the brackets may be the same or different.

5. The curable polymer composition according to claim 4, wherein X is selected from the group consisting of halogen atoms, a hydrogen atom, alkoxy group, acyloxy groups, ketoxime groups, amino groups, acid amide groups, aminoxy groups, mercapto groups and alkenyloxy groups.

6. The curable polymer composition according to claim 5, wherein X is the alkoxy group.

7. The curable polymer composition according to claim 1, wherein the silicon-containing compound (B) having the long chain hydrocarbon group is a silicon-containing compound having a $C_8$—$C_{20}$ alkyl group.

8. The curable polymer composition according to claim 1, wherein the silicon-containing compound (B) having the fluorohydrocarbon group is at least one compound selected from the group consisting of $CF_3CH_2CH_2Si(OCH_3)_3$, $CF_3(CF_2)_5CHCHSi(OCH)_3$, $CF_3(CF_2)_7CHCHSi(OCH)_3$, $CF_3(CF_2)_2CH_2Si(CH_3)(OCH_3)_2$ and $CF_3CH_2CH_2Si(CH_3)(OCH_3)_2$.

* * * * *